United States Patent
Kiyoi et al.

(10) Patent No.: US 7,010,725 B2
(45) Date of Patent: Mar. 7, 2006

(54) METHOD AND APPARATUS FOR GETTING DUMP OF A COMPUTER SYSTEM

(75) Inventors: Masahiro Kiyoi, Kawasaki (JP); Hirofumi Nagasuka, Sagamihara (JP); Masaya Ichikawa, Yokohama (JP); Akira Otsuji, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 588 days.

(21) Appl. No.: 09/915,311

(22) Filed: Jul. 27, 2001

(65) Prior Publication Data

US 2002/0029359 A1    Mar. 7, 2002

(30) Foreign Application Priority Data

Sep. 4, 2000    (JP) .............................. 2000-271494

(51) Int. Cl.
*G06F 11/00* (2006.01)
(52) U.S. Cl. ...................................................... 714/42
(58) Field of Classification Search .................. 714/42
See application file for complete search history.

(56) References Cited

U.S. PATENT DOCUMENTS 5,043,871 A * 8/1991 Nishigaki et al. ........... 707/202

FOREIGN PATENT DOCUMENTS

| JP | 406348528 A | * 12/1994 |
| JP | 7-234808 | 9/1995 |
| JP | 10-333944 | 12/1998 |

* cited by examiner

*Primary Examiner*—Robert Beausoliel
*Assistant Examiner*—Michael Maskulinski
(74) *Attorney, Agent, or Firm*—Mattingly, Stanger, Malur & Brundidge, P.C.

(57) ABSTRACT

According to the present invention, as regards a computer system that uses virtual storage management, because content of auxiliary storage utilized by paging is used, dump information can be obtained by outputting only a part of the content of the auxiliary storage at the time of occurrence of an abnormal system condition. As a result, time required to restart the computer system and business can be shortened. What is more, because it is not necessary to add a special external storage for obtaining dump information, computer resources can be utilized more efficiently.

8 Claims, 12 Drawing Sheets

800
ADDRESS
TRANSLATION
TABLE

METHOD AND APPARATUS FOR GETTING DUMP OF A COMPUTER SYSTEM

BACKGROUND OF THE INVENTION

The present invention relates to a method for getting a system dump that collects information required to investigate a cause of a failure when the failure of a computer system occurs.

In the event that a failure occurs during operation of the computer system, it is necessary to obtain content of virtual storage, which has been utilized at that time by the computer system, in order to investigate its cause. Hereinafter, the information is referred to as "dump information".

On the other hand, a workload executed by a computer system, and quantity of transacted data, are increasing year by year. In order to cope with the situation, sizes of virtual storage and main storage, which can be managed by the computer system, are also becoming larger. This results in an increase in quantity of dump information, which should be gotten in the event of a failure, causing time for getting the dump information to be lengthened. Therefore, time required to restart the system after the occurrence of the failure becomes longer.

Methods for avoiding such a delay in system restart are described in Japanese Patent Laid-Open No. Hei 7-234808 and Japanese Patent Laid-Open No. Hei 10-333944.

In the Japanese Patent Laid-Open No. Hei 7-234808, a method for getting a dump of a computer system having duplexed main storage is disclosed. In the Japanese Patent Laid-Open No. Hei 7-234808, a method for preventing a delay in system restart is disclosed. In this case, the delay is prevented in the following manner: in the event that an abnormal condition of a system occurs, memory information on one side is gotten as dump information, and the system is restarted using a memory on the other side.

In the Japanese Patent Laid-Open No. Hei 10-333944, a method for preventing a time delay in restarting a system is disclosed as follows. First of all, a dump for a memory area, in which a core portion of an operating system is loaded at the time of restart, is acquired before starting operation for restarting the system. After that, the following programs are executed in parallel: a program for restarting the system while dumping a memory area, which will be used, before using the memory area, if the memory area has not been dumped; and a program for successively dumping areas that have not been dumped.

As described above, in the prior art, the methods for outputting information, which is stored on the main storage, as dump information is disclosed. However, concerning a computer system that adopts virtual storage management, when an abnormal condition of a system occurs, data, which has been paged out to an auxiliary storage, should also be obtained as dump information.

The computer system, which adopts the virtual storage management, may output (page out) a part of virtual storage to an external storage in order to perform concurrent processing in large quantity in the main storage having a limited size, or may input (page in) an area of the virtual storage to the main storage when referring or updating the area of the virtual storage. In the prior art described above, there is no description of a method for shortening time required to restart a system while enabling acquisition of such dump information that is not allocated on main storage.

To be more specific, in the prior art described above, when a failure occurs in a computer system, if it is required to acquire information on the whole virtual storage, restart of the computer system is not permitted until information, which has been paged out to the auxiliary storage, is acquired as dump information. In addition, in the prior art described above, it is necessary to add an external storage for storing the dump information.

SUMMARY OF THE INVENTION

An object of the present invention is to shorten time required to restart a system and business when a failure of the system occurs, even if information on the whole virtual storage is acquired. Another object of the present invention is to decrease a number of external storage required to obtain dump information.

Typical means for achieving the above-mentioned objects will be described as below.

According to one aspect of the present invention, there is provided a method for getting dump of a computer system that adopts virtual storage management by which virtual storage is available using main storage, auxiliary storage, and an address translation table for indicating a location in the main storage or in the auxiliary storage to which an individual virtual-storage area is allocated, said method comprising the steps of:

providing the auxiliary storage with first auxiliary storage and second auxiliary storage;

operating the computer system using either of the first auxiliary storage or the second auxiliary storage;

determining a location to which the address translation table is allocated, when occurrence of a failure in the computer system is detected;

determining a location in the main storage, or in the auxiliary storage, where information in the virtual-storage area corresponding to the address translation table is stored, which is described in the address translation table;

transferring the content of the virtual-storage area from the main storage to the auxiliary storage, if the content of the virtual-storage area is allocated to the main storage; and switching the first auxiliary storage to the second auxiliary storage for use if the first auxiliary storage is used for operation, or switching the second auxiliary storage to the first auxiliary storage for use if the second auxiliary storage is used for operation.

DESCRIPTION OF THE PREFERRED EMBODIMENTS

Embodiments of the present invention will be described in detail with reference to drawings as below.

In the first place, a first embodiment will be described with reference to FIGS. 1 through 7.

Figure 1:
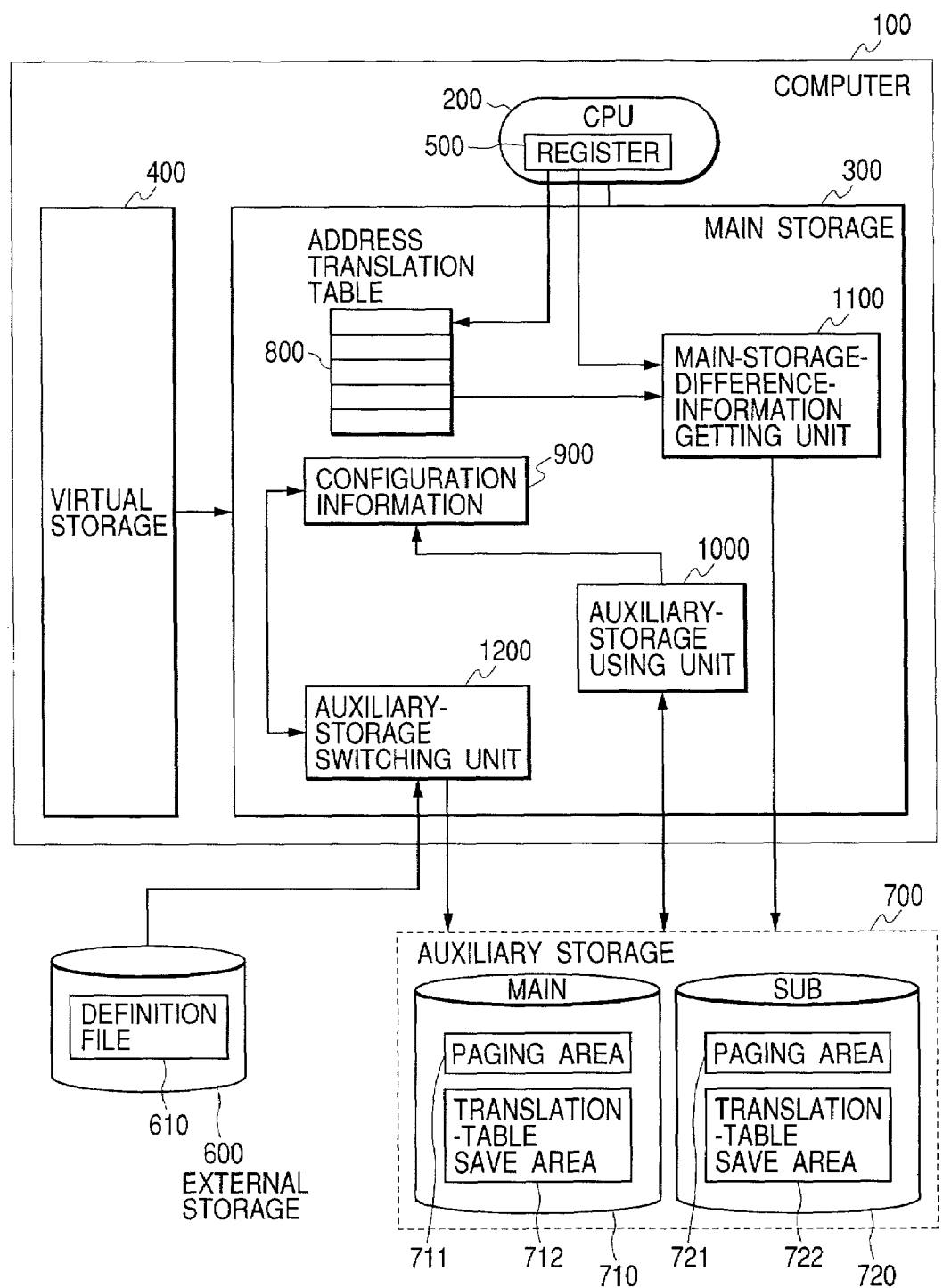
FIG. 1 is a configuration diagram illustrating a computer system that embodies the present invention.

FIG. 1 is a configuration of a computer system that embodies the present invention. A computer 100 comprises a CPU 200 and main storage 300. In addition, the computer 100 includes virtual storage 400. As described later, content of this virtual storage 400 exists in the main storage 300 or auxiliary storage 700.

The CPU 200 comprises various kinds of registers 500, such as a control register for holding various kinds of control information including an address translation table origin in real storage, and a general register used for operation, as components.

Besides the auxiliary storage 700, external storage 600 is connected to the computer 100.

Parameters, which are required by an operating system, when the computer system is operated, are stored in a definition file 610 that is stored in the external storage 600. As parameters relating to the embodiment of the present invention, there are identifiers of external storage 710, 720, which are used as auxiliary storage, and an identifier of the external storage 710 that is used as auxiliary storage when the system is operated normally.

In this embodiment, the auxiliary storage 700 is duplexed by main auxiliary storage 710 and sub auxiliary storage 720. The above-mentioned definition file 610 defines the following: at the time of normal operation, the main auxiliary storage 710 is selected from among the duplexed auxiliary storage 700, and is used; and the sub auxiliary storage 720 is used as an alternate. Moreover, the main auxiliary storage 710 and the sub auxiliary storage 720 comprise paging areas 711, 721 respectively, and also comprise translation-table save areas 712, 722 respectively. Purposes of utilizing each area will be described in detail as below.

Next, various kinds of processing programs and information, which are allocated on the main storage 300 beforehand, will be described.

Figure 2:
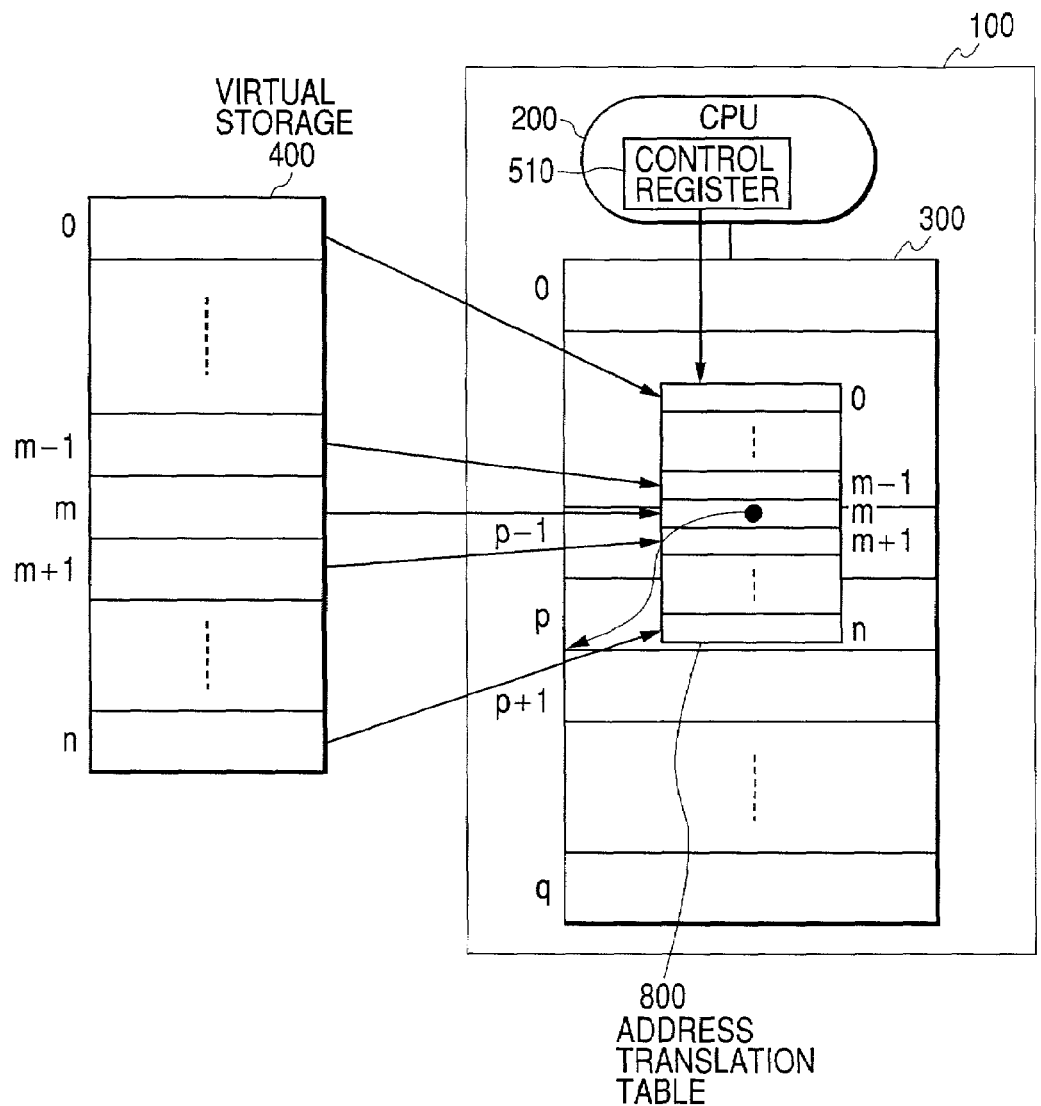
FIG. 2 is an explanatory diagram illustrating how to determine a real address from a virtual address, and a relation between virtual storage and main storage.

An address translation table 800 will be described later in detail with reference to FIG. 2.

An identifier of the external storage 710, which is currently used, is stored in a configuration information area 900.

An auxiliary-storage using unit 1000 performs paging processing, which uses the auxiliary storage 710, by obtaining the identifier of the external storage 710, which is currently used, from the configuration information area 900. The paging processing means the following: when a utilization ratio of the main storage 300 becomes high, outputting areas, which are not used recently, to the paging area 711 in the auxiliary storage 710; and if areas of the virtual storage 400, which are accessed, have been output to the paging area 711 in the auxiliary storage 710, inputting the area of the virtual storage 400 to the main storage 300.

When an abnormal condition of the system occurs, a main-storage-difference-information getting unit 1100 performs the following: referring to contents of the registers 500 and content of the address translation table 800 as input information; using the input information, requesting the auxiliary-storage using unit 1000 to page out area of the virtual storage 400, which have been updated since the area were allocated to the main storage 300.

As is the case with the paging processing at the time of normal system operation, the auxiliary-storage using unit 1000, which has received the request, pages out the requested area of the virtual storage 400. To be more specific, the auxiliary-storage using unit 1000 outputs the requested area to the paging area 711 in the auxiliary storage 710.

After completing page-out processing of the area of the virtual storage 400, which has used the main storage 300, the main-storage-difference-information getting unit 1100 outputs the address translation table 800 to the translation-table save area 712 in the auxiliary storage 710.

After completing the processing described above, the computer system operates a switching unit 1200. The switching unit 1200 determines an identifier of the auxiliary storage 710, which is currently used, judging from information in the configuration information area 900. In addition, identifiers of the auxiliary storage 710, 720 defined by this computer system are determined using the definition file 610. According to a result of the determination, when restarting the computer system, content of the configuration information area 900 is redefined; that is to say, the content is set to be an identifier of the sub auxiliary storage 720. This prevents the auxiliary storage 710, which stores the content of the virtual storage 400 at the time of occurrence of an abnormal condition, from being used when restarting the system. Moreover, after restarting the computer system, real addresses or page-out addresses are stored in the address translation table during program execution; and the content of the paged-out virtual storage is stored in the switched auxiliary storage.

Next, how to determine a real address from a virtual address, and a relation between the virtual storage and the main storage, will be described with reference to FIG. 2.

The virtual storage 400 is divided into units having a fixed length. Each of the divided units is called a page. The virtual storage 400 in this embodiment is constituted of n+1 pages. A first page is called page 0, and the last page is called page n.

An area of the virtual storage 400 is allocated to the main storage 300 or the auxiliary storage 710 on a base of one page. It is the address translation table 800 that manages a location of an area in the main storage 300 or a location of an area in the auxiliary storage 710, to which each page of the virtual storage 400 is allocated. The address translation table 800 is allocated to contiguous areas on the main storage 300. As regard the address translation table 800, an entry is provided for each page of the virtual storage 400. To be more specific, the address translation table 800 is constituted of n+1 entries. Order of each page of the virtual storage 400 corresponds to order of each entry of the address translation table 800. For example, an entry of the address translation table 800 corresponding to page m of the virtual storage 400 is a number m entry. The address translation table origin in real storage is stored in the control register 510.

The main storage 300 is also divided into units having a fixed length in a similar manner. As is the case with the units of the virtual storage 400 described above, each divided unit is also called a page. A length of the page of the main storage 300 is the same as that of the virtual storage 400. The main storage 300 of this embodiment is constituted of q+1 pages. A first page is called page 0, and the last page is called page q.

In this manner, equalizing a length of the virtual storage 400 with a length of the main storage 300 permits a page of the virtual storage 400 and a page of the main storage 300 to be associated using the address translation table 800. FIG. 2 shows that page m of the virtual storage 400 is mapped to page p+1 of the main storage 300.

Figure 3:
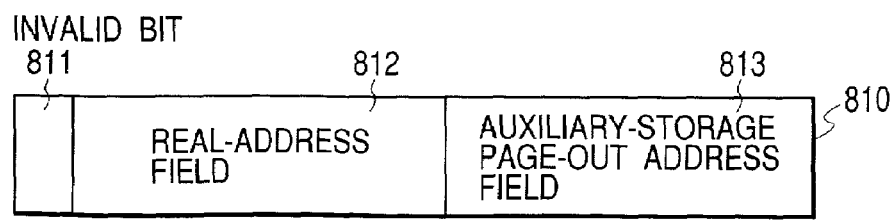
FIG. 3 is a structure diagram illustrating an entry of an address translation table.

In the next place, content of the entry of the address translation table 800 will be described with reference to FIG. 3.

All entries of the address translation table 800 have the same structure. FIG. 3 shows a structure of one entry 810 that belongs to the address translation table. Moreover, the address translation table entry 810 comprises an invalid bit 811, a real-address field 812, and an auxiliary-storage page-out address field 813.

A page number of a page in the main storage 300, to which a page in the virtual storage 400 corresponding to the entry is allocated, is stored in the real-address field 812. In this connection, the invalid bit 811 indicates that the real-address field 812 is valid or invalid.

If the invalid bit 811 is ON, it indicates that content of the real-address field 812 is invalid. In other words, a virtual page corresponding to the entry is not used, or has been paged out to the auxiliary storage 710. If the virtual page has been paged out to the auxiliary storage 710, its page-out address is stored in the auxiliary-storage page-out address field 813.

On the other hand, if the invalid bit 811 is OFF, it indicates that the content of the real-address field 812 is valid. To be more specific, it shows that a page in the virtual storage 400 corresponding to the entry is allocated to a page in the main storage 300 indicated by the real-address field 812.

By means of the main-storage-difference-information getting unit 1100 and the auxiliary-storage using unit 1000, contents of the paging area 711 and the translation-table save area 712, which have been output to the auxiliary storage 710, become dump information when an abnormal condition of the system occurs.

Figure 4:
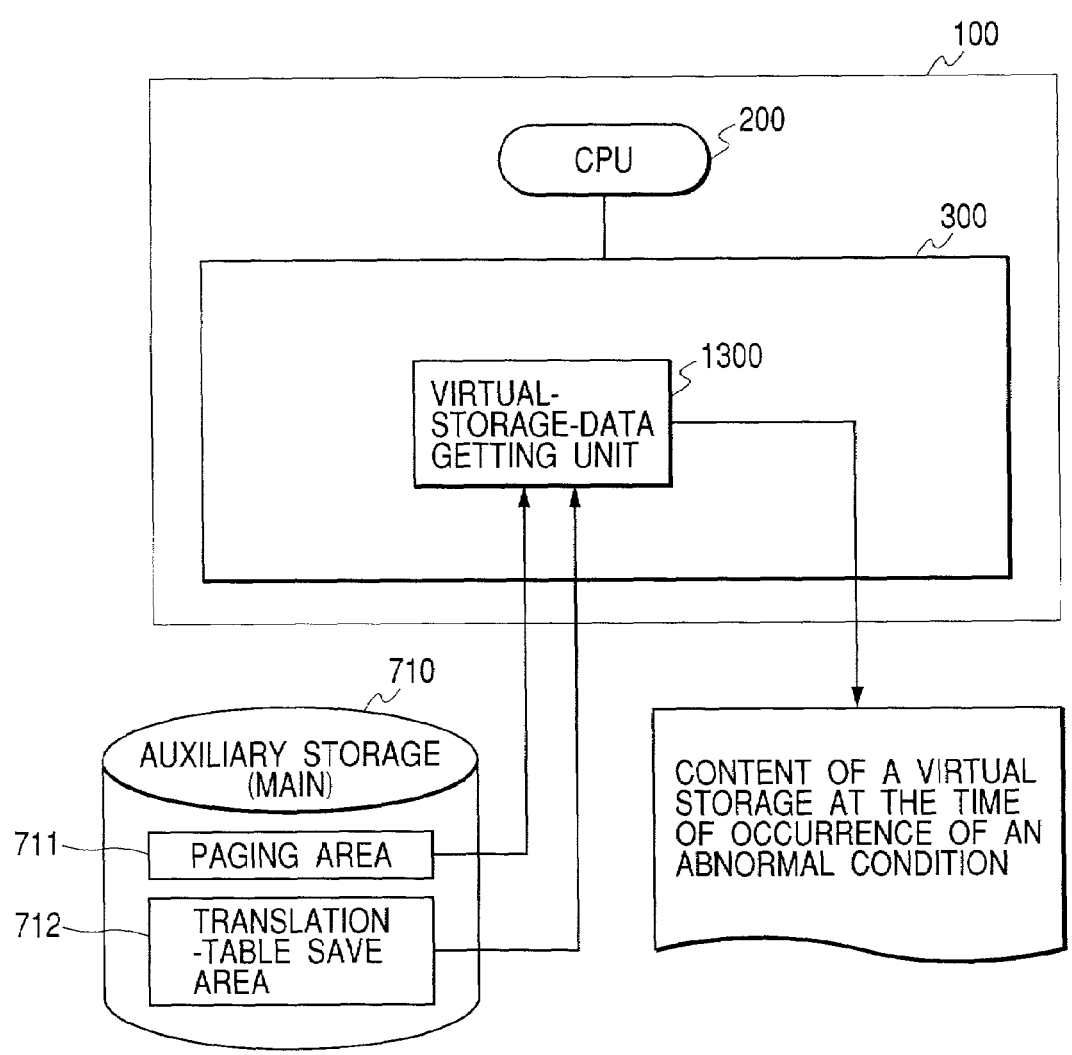
FIG. 4 is an explanatory diagram illustrating a virtual-storage-data getting unit.

A virtual-storage-data getting unit 1300 shown in FIG. 4 inputs the contents of the paging area 711 and the translation-table save area 712 as dump information. To be more specific, the virtual-storage-data getting unit 1300 performs the following: acquiring content of the address translation table 800, which is stored in the translation-table save area 712; according to the content, identifying an area, in which an area indicated by a virtual address is stored, judging from the paging area 711; and in the main storage 300, rebuilding content of the virtual storage at the time of occurrence of an abnormal condition. The virtual-storage management-information getting unit 1300 and the main-storage-difference-information getting unit 1100 may be operated on the same computer system, or may be operated on another computer system that shares the external storage 600 and the auxiliary storage 700.

Figure 5:
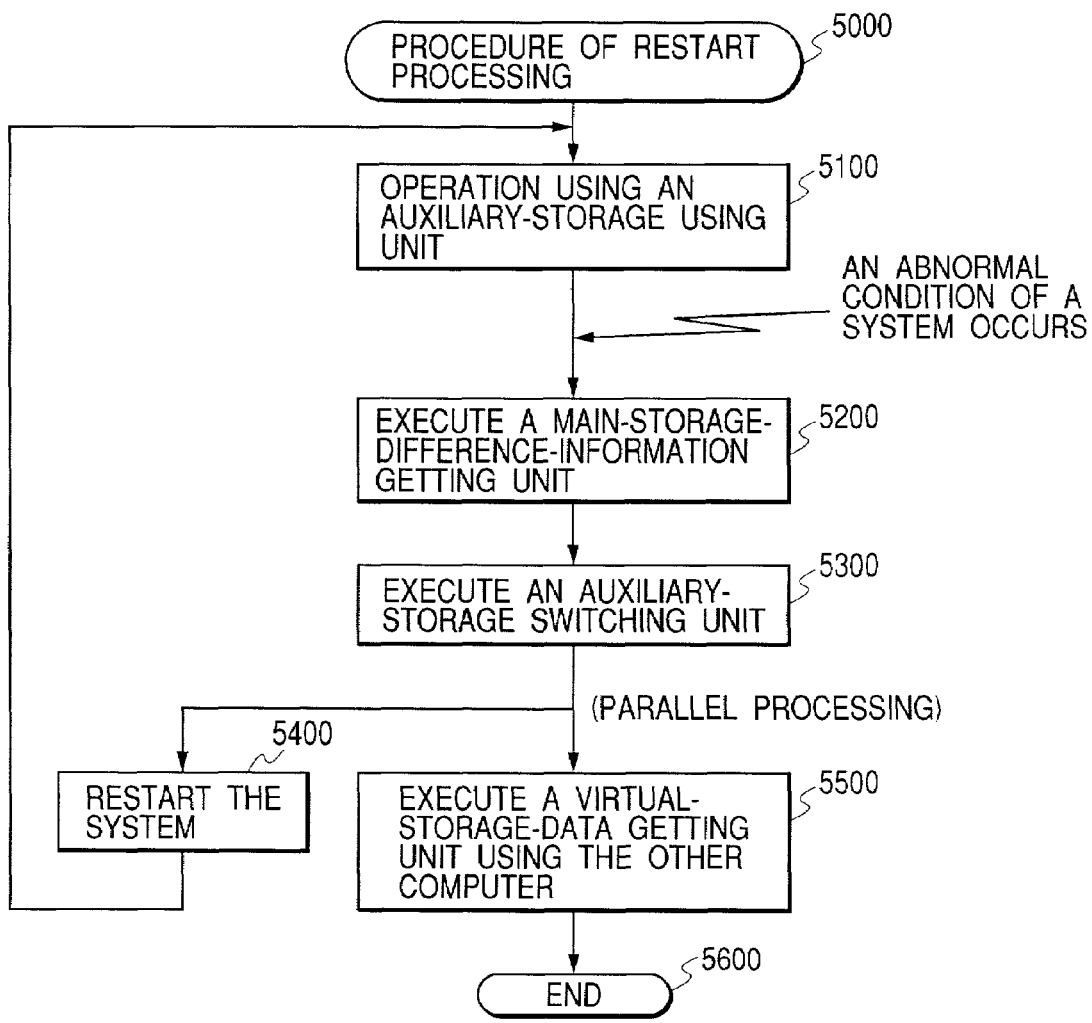
FIG. 5 is a flowchart of restart processing procedure.

Next, a processing flow of getting dump information and restarting the system, when an abnormal condition of the computer system occurs, will be described with reference to FIG. 5. By the way, FIG. 5 shows an example of a case in which the virtual-storage-data getting unit 1300 is operated on another computer system that shares the external storage 600 and the auxiliary storage 700. In a step 5100, the computer system, which uses the auxiliary-storage using unit 1000, is operated. In this case, when an abnormal condition of the system occurs, the main-storage-difference-information getting unit 1100 is operated (step 5200).

The main-storage-difference-information getting unit 1100 performs the following: extracting only areas, each of which has been updated since the area was allocated to pages in the main storage 300, from the virtual storage 400; paging out the areas from the main storage 300; and outputting the address translation table 800 to the auxiliary storage 710. In addition to the areas that have been paged out to the auxiliary storage 710 before, the information is used as dump information.

After completing the operation of the main-storage-difference-information getting unit 1100, a switching unit 1200 is operated (step 5300) to switch the identifier of the auxiliary storage 710 registered in the configuration information area 900 to the identifier of the auxiliary storage 720. This prohibits the auxiliary storage 710 from being used. Therefore, referring to the dump information becomes possible after the switching. Then, in a step 5400, restart processing of the computer system is started. In parallel with it, in another computer system, the virtual-storage-data getting unit 1300, which acquires content of the virtual storage, is operated while regarding information stored in the auxiliary storage 710 as dump information (step 5500).

As described above, the restart processing of the computer system, and the virtual-storage-information getting processing at the time of occurrence of an abnormal condition, which uses paging data of the virtual storage 400 as dump information, can be performed concurrently. Because of it, time required to restart the system can be shortened.

Figure 6:
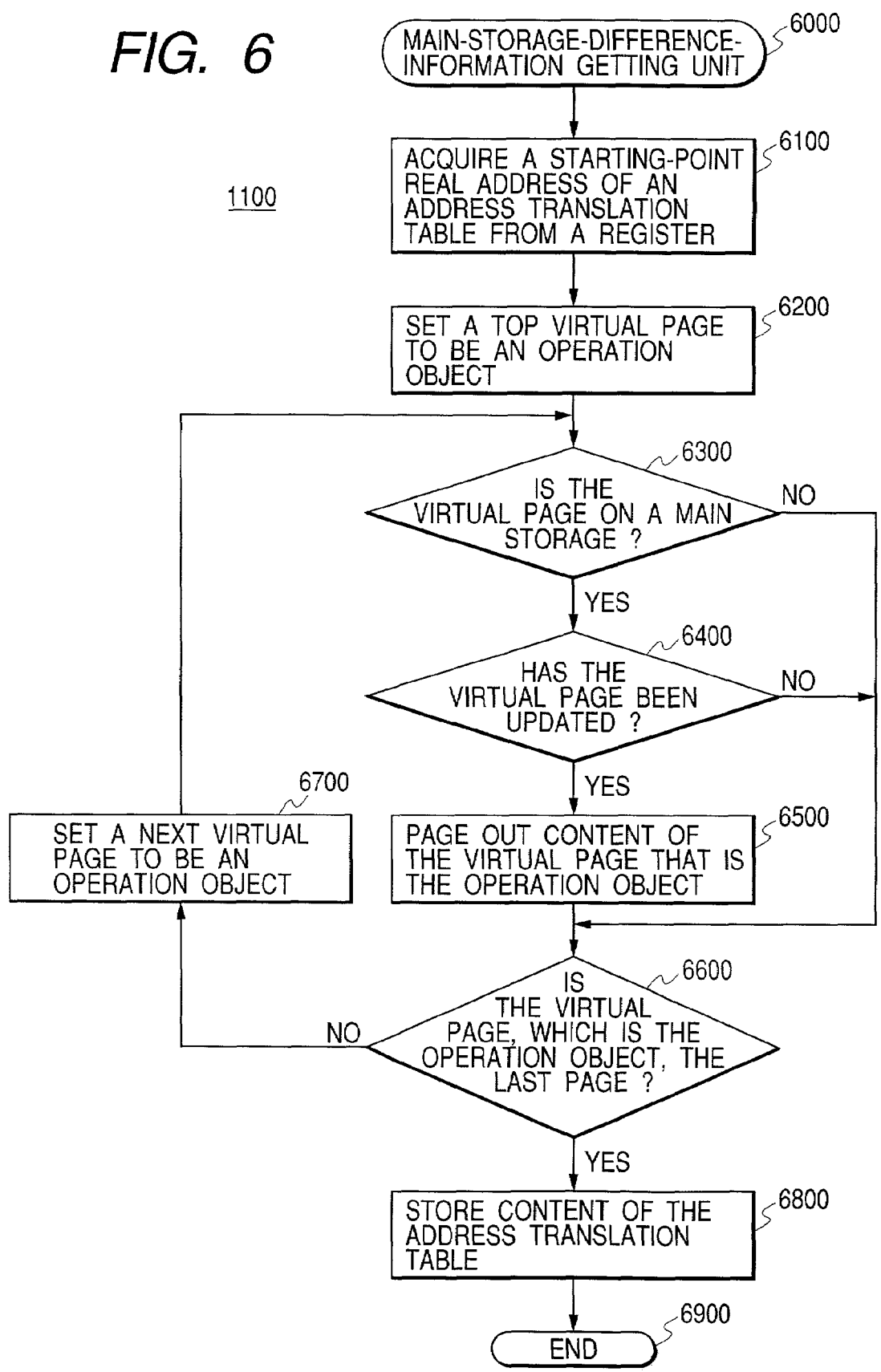
FIG. 6 is a flowchart of a main-storage-difference-information getting unit.

FIG. 6 is a processing flowchart of the main-storage-difference-information getting unit 1100.

In the first place, according to contents of the registers 500, a starting-point real address of the address translation table 800 in the main storage 300 is acquired (step 6100).

Next, the first virtual page is set to be an operation object (step 6200). To be more specific, the first entry of the address translation table 800 is set to be an operation object.

Next, content of the invalid bit 810 in the entry is judged (step 6300). If this bit is ON, the object virtual page has already been paged out, or is in a unused state. As regards such a virtual page, information, which has already been paged out,-can be used as dump information. Therefore, process after that is not performed, but proceeds to the next entry.

If the invalid bit 810 is OFF, the object virtual page is currently using the main storage 300. In this case, whether or not this object virtual page has been updated since the object virtual page was allocated to the main storage is repeatedly judged (step 6400). On the assumption that the computer system is in advance provided with a means for executing a machine language instruction for obtaining an update state for each page in the main storage, it is possible to judge the update in the step 6400 by executing the instruction. If it is judged that the object virtual page is not updated, and if this virtual page has ever been paged out before the judgment, information in the paging area 711 can be used as dump information.

In the judgment of the step 6400, if the object virtual page is updated, the virtual page is paged out to the auxiliary storage 710 (step 6500). Specifically, a request for page-out processing is issued to the auxiliary-storage using unit 1000. As regards the paged-out virtual page, a location of the paged-out virtual page is stored in the auxiliary-storage page-out address 813 of the address-translation-table entry corresponding to the page.

In a step 6600, whether or not the operation object is the last page is checked. To be more specific, if an entry for the current operation object is the last entry of the address translation table 800, the operation object is judged to be the last page. If the operation object is not the last entry, the next virtual page is set to be an operation object (step 6700) before returning to the step 6300. If the operation object is the last entry, the process proceeds to the step 6700.

After performing the above-mentioned processing for all virtual pages, the address translation table 800 is output to the translation-table save area 712 in the auxiliary storage 710 (step 6800). The information is used when acquiring the content of the virtual storage from the paged-out information.

Figure 7:
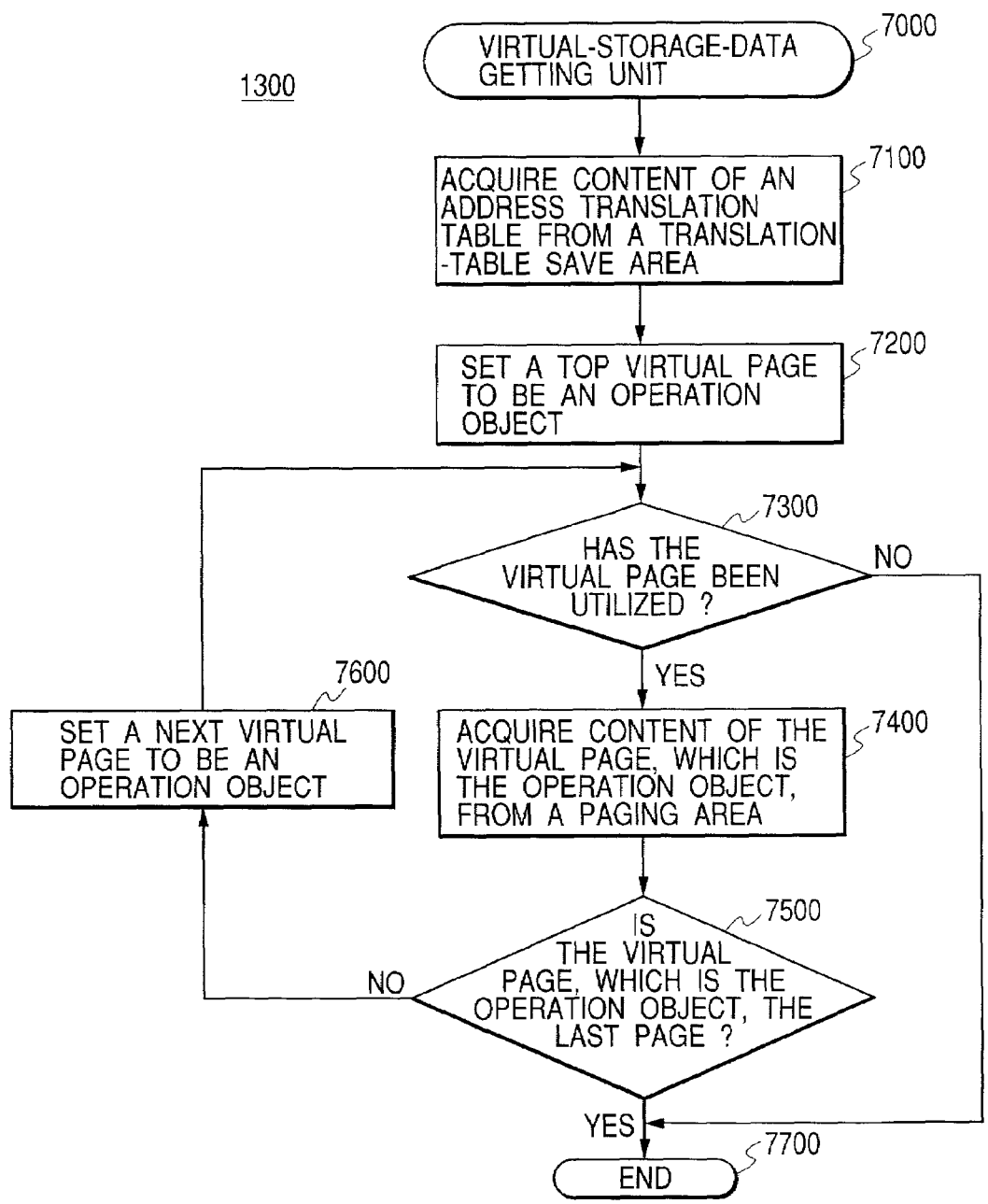
FIG. 7 is a flowchart of a virtual-storage-data getting unit.

FIG. 7 is a processing flowchart of the virtual-storage-data getting unit 1300. The virtual-storage-data getting unit 1300 inputs information from the auxiliary storage 710 that is used when an abnormal condition of the system occurs. As regards the auxiliary storage 710, information on the virtual storage is stored in the paging area 711 and the translation-table save area 712.

To begin with, content of the address translation table 800 is acquired from the translation-table save area 712 (step 7100). Next, the first entry of this address translation table 800 is set to be an operation object (step 7200).

Next, whether or not the auxiliary storage page-out address 813 in the entry of the address translation table 800 is 0 is judged (step 7300). If the auxiliary storage page-out address 813 is 0, it is found out that the object virtual page was in a unused state when the abnormal condition of the system has occurred. Therefore, it is not necessary to acquire the content of the virtual storage.

If the auxiliary storage page-out address 813 is not 0, content, which is stored in an area indicated by the address, is acquired from the paging area 711. Then, the content is set as content of the object virtual page (step 7400).

After completing the processing described above, whether or not the operation object is the last page is checked in a step 7500. If the operation object is not the last entry, the next virtual page is set to be an operation object (step 7600) before returning to the step 7300. If the operation object is the last entry, the operation of the virtual-storage-data getting unit 1300 ends.

By the way, in this embodiment, the main-storage-difference-information getting unit 1100 outputs the content of the address translation table 800 to the translation-table save area 712. However, instead of it, the following method may also be used: outputting a virtual page, which includes the above-mentioned address translation table 800, to the paging area 711; and storing an address indicating an area in the auxiliary storage, to which the virtual page has been output, in the translation-table save area 712. In this case, the virtual-storage-data getting unit 1300 acquires the content of the address translation table 800 using content stored in an area indicated by the address, which is the content of the translation-table save area 712, as input information.

Next, a second embodiment will be described with reference to FIGS. 8, 9, and 10. In the first embodiment, a number of the virtual storage 400, which existed in the computer system, was one. In contrast to this, the second embodiment shows a method for getting dump information, which is used when there are a plurality of pieces of virtual storage in the computer system.

Figure 8:
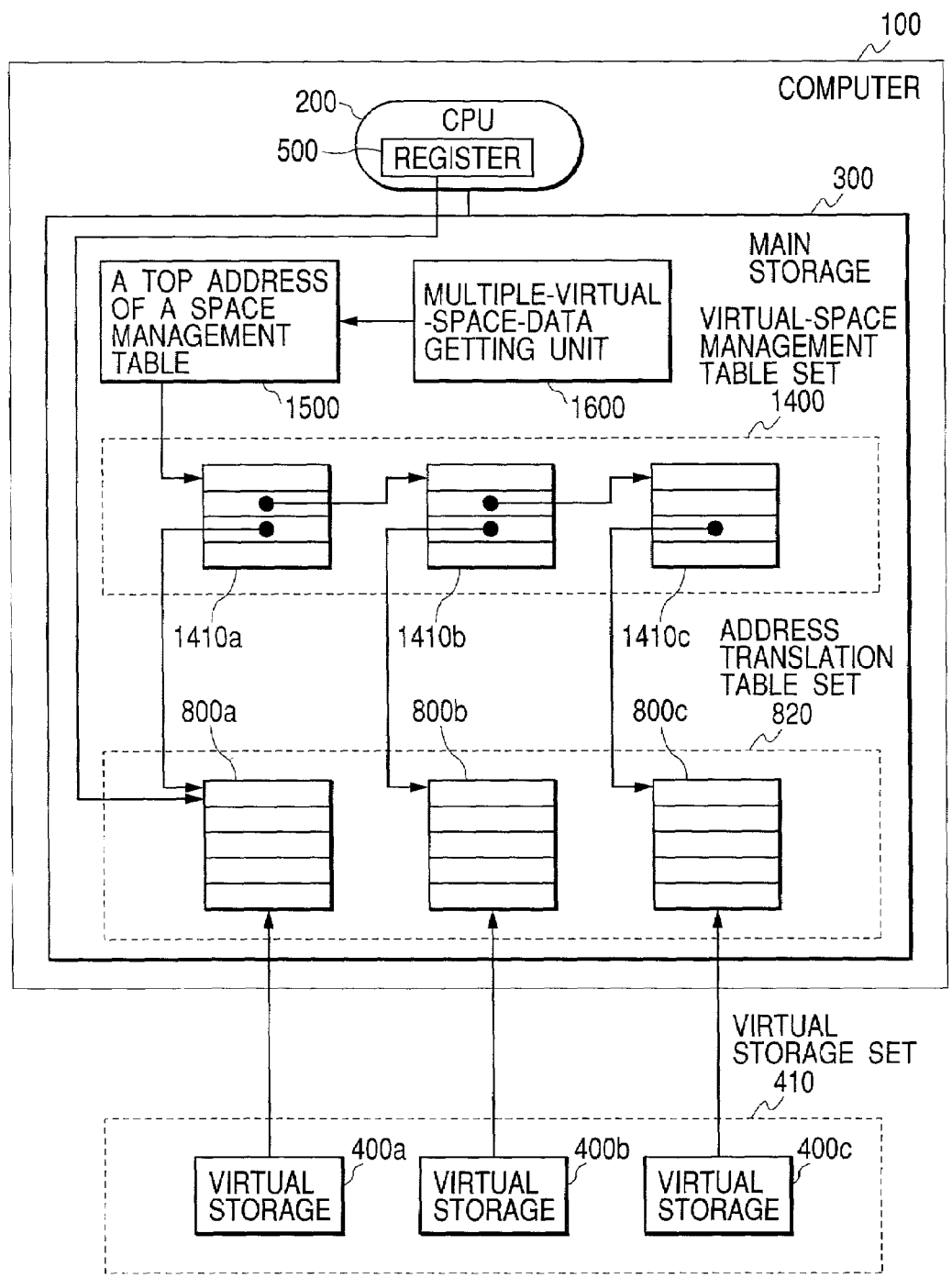
FIG. 8 is a configuration diagram illustrating a computer system according to a second embodiment.

FIG. 8 is a configuration diagram illustrating a computer system according to a second embodiment. In FIG. 8, a virtual storage set 410 comprises a plurality of pieces of virtual storage. Each piece of virtual storage exists in each virtual space that is operated by the computer system. In FIG. 8, there are three virtual spaces (that is, three virtual storages) in the computer system.

An address translation table set 820 is constituted of a plurality of address translation tables 800a, 800b, and 800c, each of which corresponds to each virtual space.

A virtual-space management table set 1400 is constituted of a plurality of virtual-space management tables 141a, 141b, and 141c, each of which corresponds to each virtual space.

Content of a space-management-table origin address 1500 indicates an origin address of the virtual-space management tables that are chained in the main storage 300.

In the restart procedure of the first embodiment shown in FIG. 5, when an abnormal condition of the system occurs, the main-storage-difference-information getting unit 1100 is operated. However, in the second embodiment, as shown in FIG. 8, a multiple-virtual-space-data getting unit 1600 is operated instead of it.

The other configurations are the same as those of the first embodiment shown in FIG. 1. Therefore, description of them is omitted in FIG. 8.

Figure 9:
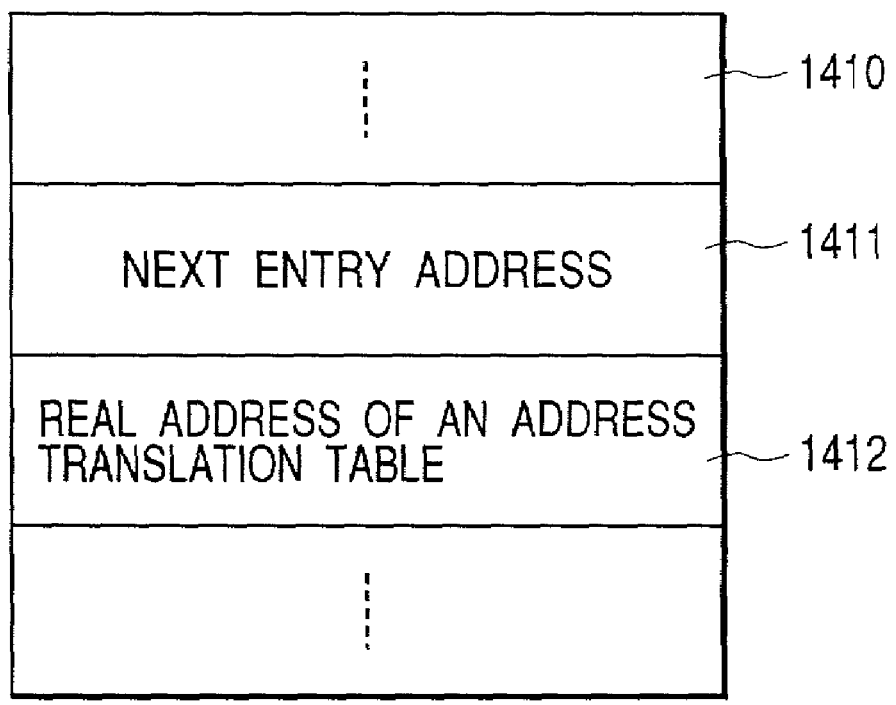
FIG. 9 is a structure diagram illustrating a virtual-space management table.

FIG. 9 shows a configuration of a virtual-space management table 1410 included in the virtual-space management table 1400. The virtual-space management table 1410 has control information that is required to operate the computer system in each virtual space. In a next entry address 1411, an address of the next virtual-space management table, which is chained in the main storage 300, is stored. However, as regards the last chained table, content in the next entry address 1411 is null. In an address-translation-table real address 1412, a real address of the address translation table 800 of a virtual space, which corresponds to this virtual-space management table 1410, is stored.

Figure 10:
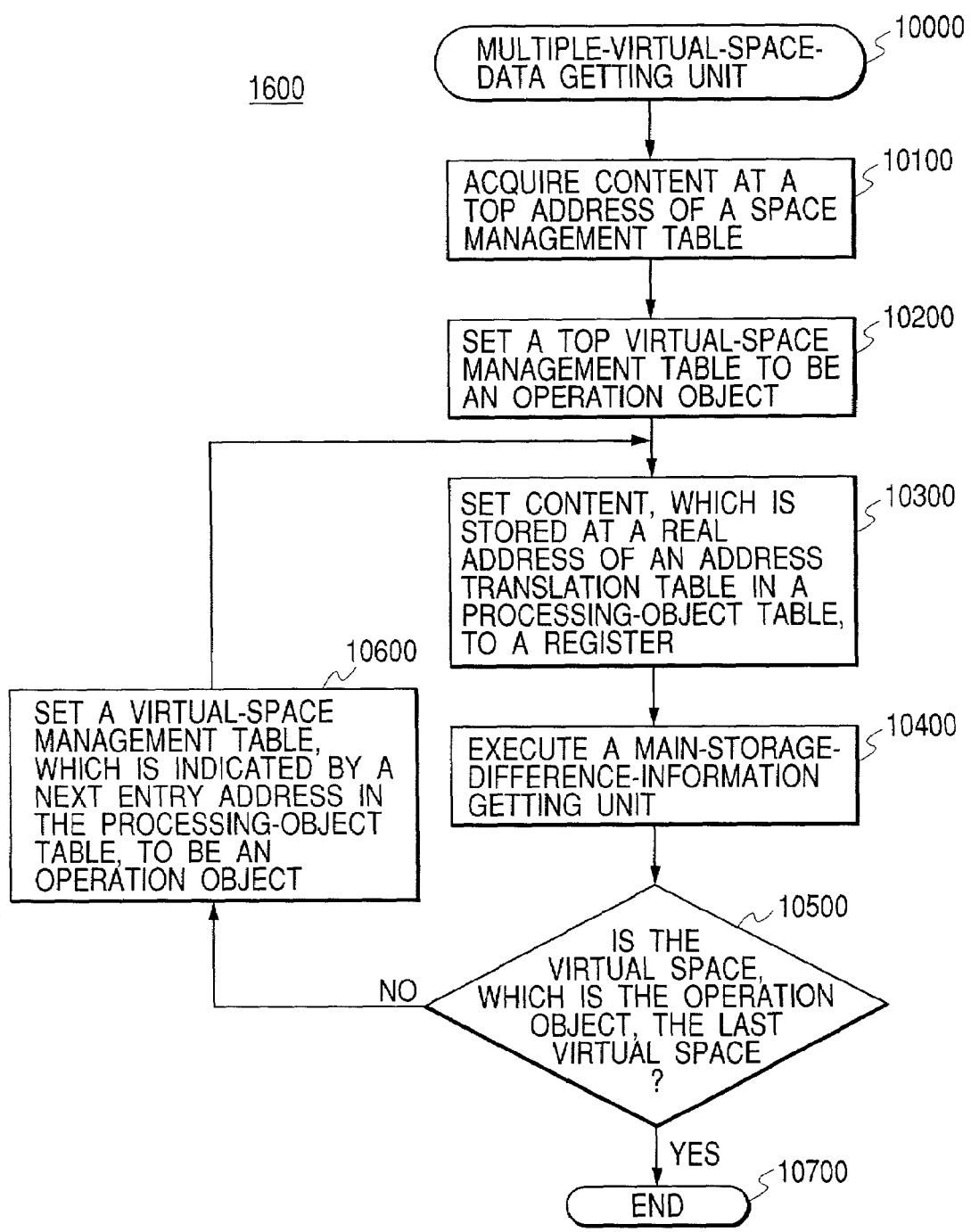
FIG. 10 is a flowchart of a multiple-virtual-space-data getting unit.

FIG. 10 is a processing flowchart of the multiple-virtual-space-data getting unit 1600. In the first place, content of the space-management-table top address 1500 is acquired (step 10100). A virtual-space management table 1410 indicated by this address is set to be a first operation object (step 10200).

Next, content of the address-translation-table real address 1412 in the virtual-space management table 1410 of the operation object is set to the register 500 (10300). Under these conditions, the main-storage-difference-information getting unit 1100 is operated (step 10400). Processing of the main-storage-difference-information getting unit 1100 is the same as that of the first embodiment shown in FIG. 6.

Because the real address of the address translation table 800 corresponding to the first virtual space is stored in the register 500 in the step 10300, dump information of the first virtual space is firstly obtained by the processing up to this point.

Next, whether or not the operation object is the last virtual space is judged (step 10500). This judgment processing can be achieved by judging whether or not content of the next entry address 1411 in the virtual-space management table 1410 of the processing object is null.

If the operation object is the last virtual space, processing ends. If not, a virtual-space management table indicated by the next entry address 1411 in the virtual-space management table 1410 is set to be an operation object (step 10600) before returning to the step 10300.

Through the processing described above, even if there are a plurality of pieces of virtual storage in the computer system, dump information can be obtained.

Figure 11:
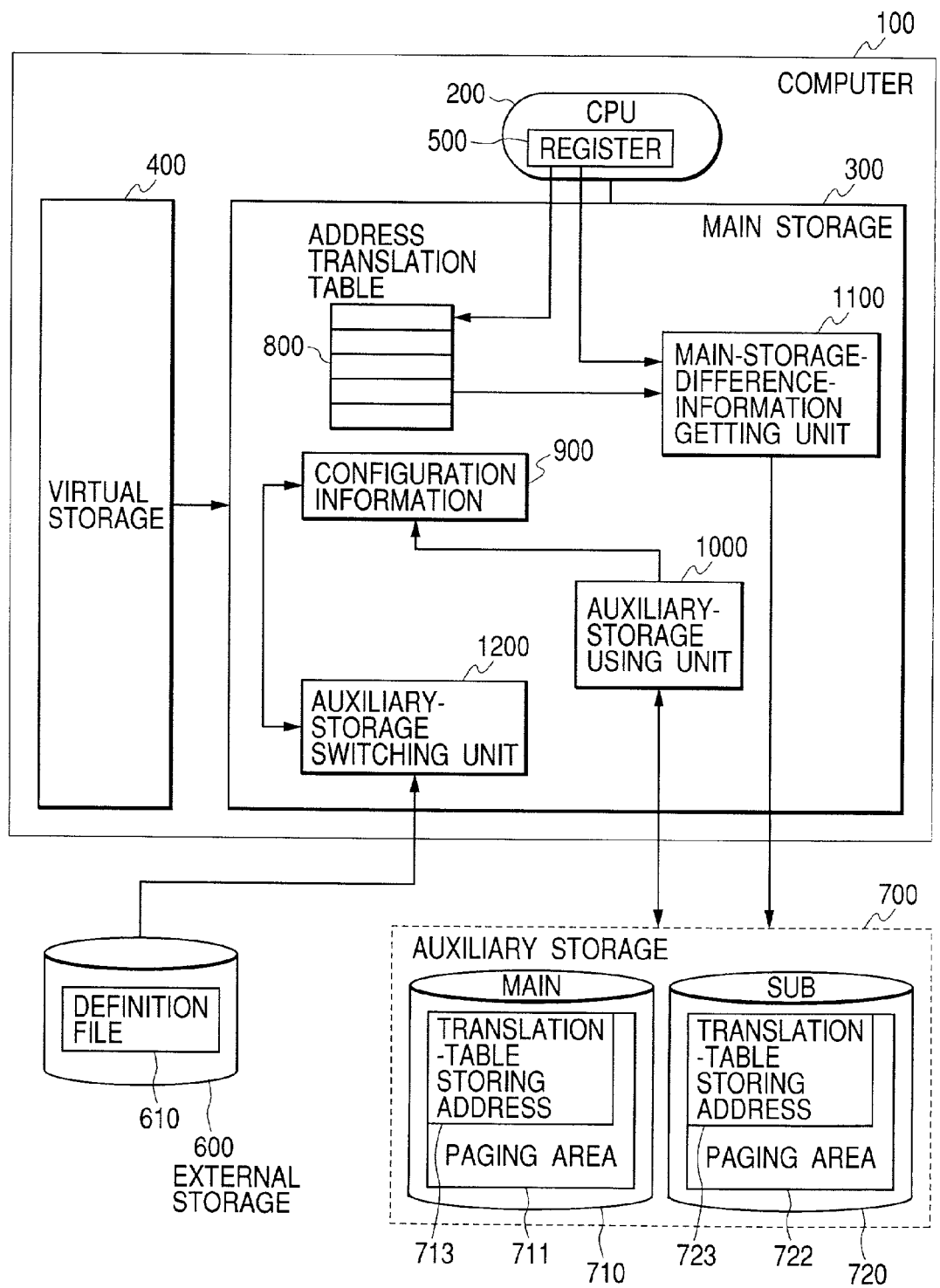
FIG. 11 is a configuration diagram illustrating a computer system according to a third embodiment.

Next, a third embodiment will be described with reference to FIGS. 11. In the third embodiment, instead of the translation-table save areas 712, 722, translation-table storing addresses 713, 723 are allocated to given locations in paging areas 711, 721.

When a page-out request for the address translation table 800 is issued, the auxiliary-storage using unit 1000 uses the translation-table storing addresses 713, 723 as storing locations.

In addition, as regards the flowchart of the embodiment shown in FIG. 6, the main-storage-difference-information getting unit 1100 does not store the address translation table 800 in the translation-table save area 712, which is shown in the step 6800. Processing except this is the same as that of the steps shown in FIG. 6.

Moreover, as regards the flowchart of the first embodiment shown in FIG. 7, instead of the processing shown in the step 7100, the virtual-storage-data getting unit 1300 inputs content of the translation-table storing address 713 in the paging area 711 described above to acquire content of the address translation table 800 at the time when the abnormal condition of the system occurs.

In this connection, it is not necessarily required to store whole content of the address translation table 800 in the translation-table storing address 713. Information to be stored may be a part of content of an address translation table, which manages a virtual page that includes the address translation table 800 itself.

Figure 12:
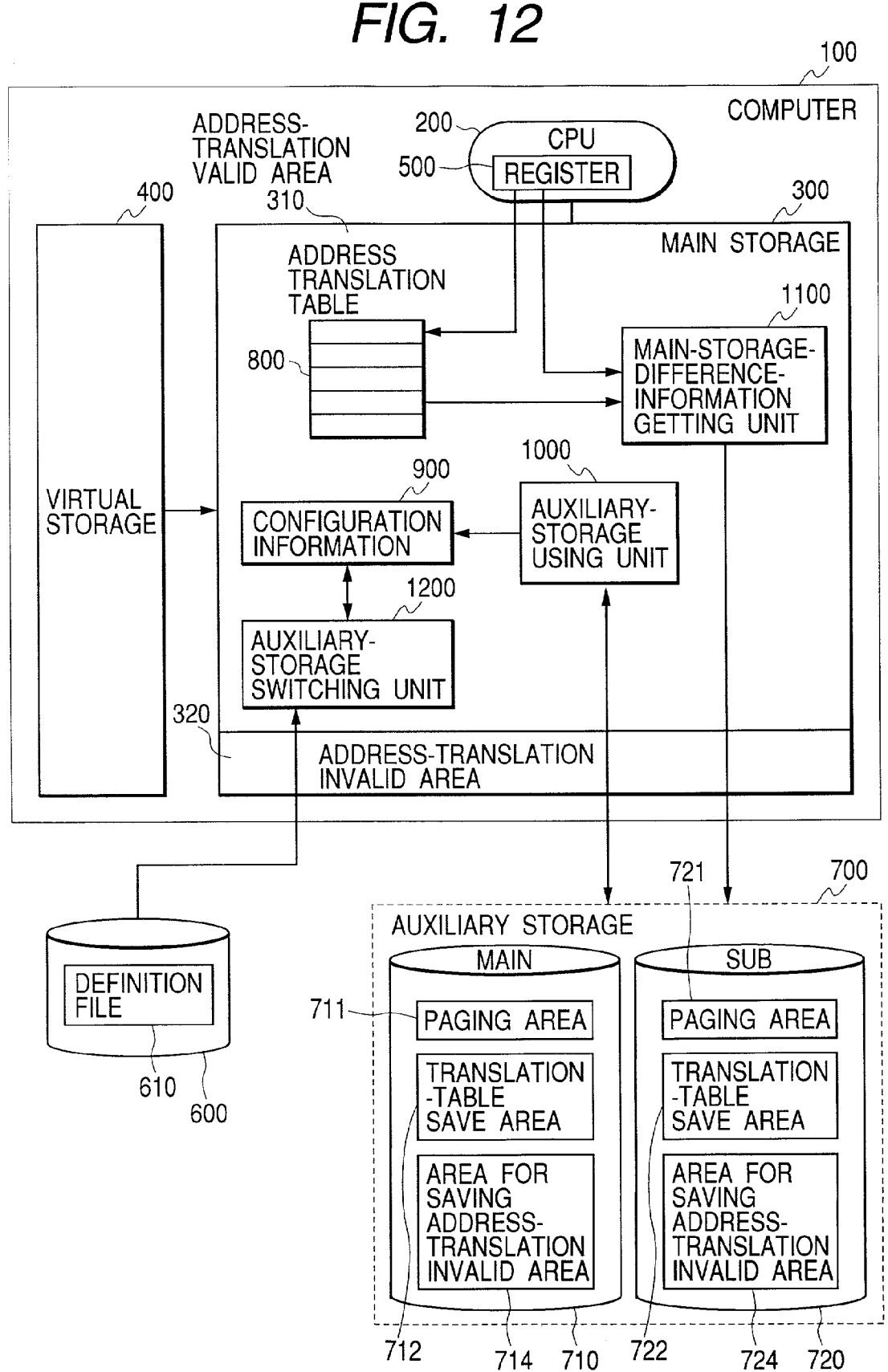
FIG. 12 is a configuration diagram illustrating a computer system according to a fourth embodiment.

Next, a fourth embodiment will be described with reference to FIGS. 12 and 13. FIG. 12 is a configuration diagram illustrating a computer system according to this embodiment. In the computer system in this embodiment, the main storage 300 is divided into an address-translation valid area 310 and an address-translation invalid area 320.

The address-translation invalid area 320 is an area that is not accessed using the address translation table for the purposes of increasing processing speed and protecting important programs more strictly, and that cannot be accessed without specifying a real address directly. The address-translation valid area 310 is an area that excludes the address-translation invalid area 320. Virtual storage is allocated to the address-translation valid area 310 using the address translation table.

Among these areas, the address-translation invalid area 320 is not output to the auxiliary storage 710 in the embodiments described above. Because of it, in the fourth embodiment, save areas for address-translation invalid area 714, 724 are additionally allocated to given areas in the auxiliary storage 710, 720.

In addition, after processing according to the same procedure as the first embodiment shown in FIG. 6, the main-storage-difference-information getting unit 1100 outputs content of the address-translation invalid area 320 to the save areas for address-translation invalid area 714, 724 in order.

Figure 13:
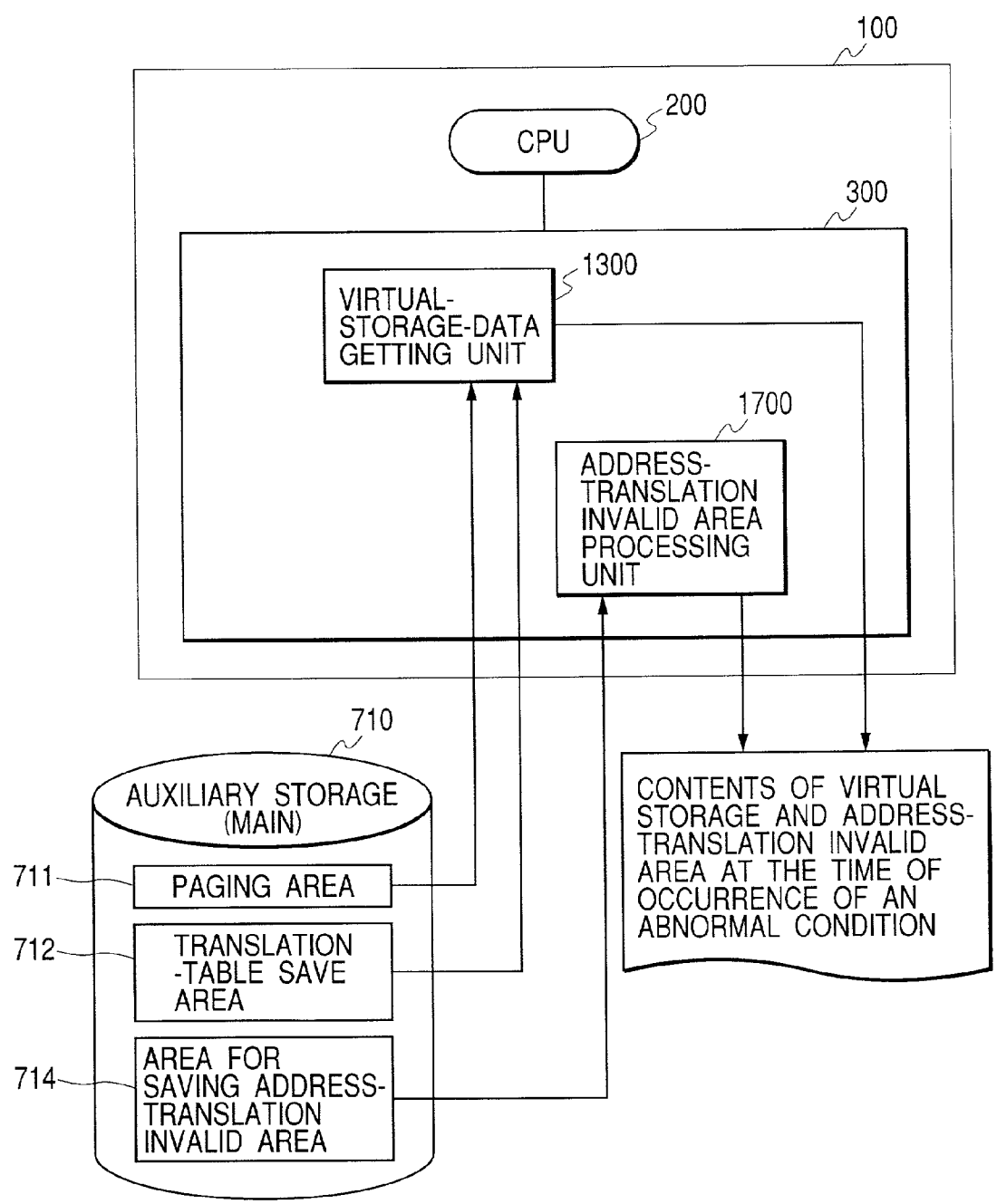
FIG. 13 is an explanatory diagram illustrating acquisition of dump information according to the fourth embodiment.

FIG. 13 is a configuration diagram illustrating a computer system that acquires content of virtual storage and an address-translation invalid area using the content, which has been stored in the auxiliary storage 710 at the time of occurrence of the abnormal condition in the fourth embodiment, as input information. In FIG. 13, an address-translation invalid area processing unit 1700 reads the content of the save area for address-translation invalid area 714 successively, and outputs the content.

By the way, it is assumed that processing of the virtual-storage-data getting unit 1300 shown in FIG. 13 is the same as the processing of the first embodiment shown in FIG. 7.

In the first, second, third, and fourth embodiments described above, time required for system restart is shortened by duplexing the auxiliary storage 700 to have the main auxiliary storage and the sub auxiliary storage, and also by switching between them when an abnormal condition occurs. However, even in the case of a computer system in which the auxiliary storage 700 is not duplexed, using the method showed in these embodiments eliminates the need for outputting all of the areas of the main storage 300 as dump information. Therefore, time required to acquire dump information can be shortened.

According to the present invention, as regards the computer system that uses the virtual storage management, because content of the auxiliary storage utilized by paging is used, dump information can be obtained by outputting only a part of the content of the auxiliary storage at the time of occurrence of the abnormal system condition. Therefore, time required to restart the computer system and business can be shortened.

What is more, because it is not necessary to add a special external storage for obtaining dump information, computer resources can be utilized more efficiently.

What is claimed is:

1. A method for getting dump of a computer system that adopts virtual storage management by which virtual storage is available using a main storage, an auxiliary storage, and an address translation table for indicating a location in the main storage or in the auxiliary storage to which an individual virtual-storage area is allocated, said method comprising:
   providing said auxiliary storage with a first auxiliary storage and a second auxiliary storage;
   operating the computer system using either of the first auxiliary storage or the second auxiliary storage;
   transferring content of the virtual-storage area on the main storage from the main storage to the auxiliary storage when a utilization ratio of the main storage becomes high;
   determining a location to which the address translation table is allocated, when occurrence of a failure in the computer system is detected;
   determining a location in the main storage, or in the auxiliary storage, where information in the virtual-storage area is stored, which is described in the address translation table;
   transferring the content of the virtual-storage area from the main storage to the auxiliary storage to which the content of the virtual-storage area is allocated when the utilization ratio of the main storage becomes high, if the content of the virtual-storage area is allocated to the main storage;
   switching the first auxiliary storage to the second auxiliary storage for use if the first auxiliary storage is used for operation, or switching the second auxiliary storage to the first auxiliary storage for use if the second auxiliary storage is used for operation,
   wherein when occurrence of a failure in the computer system is detected, content of an area in the main storage, which has not been associated with the virtual storage by the address translation table, is stored in a given area in the auxiliary storage.

2. An apparatus for getting dump of a computer system that uses virtual storage, said apparatus comprising:
   an auxiliary storage comprising a first auxiliary storage and a second auxiliary storage;
   an address translation table for indicating a location in a main storage, or in the auxiliary storage, where information in a virtual-storage area is stored;

a means for transferring content of the virtual-storage area on the main storage from the main storage to the auxiliary storage when a utilization ratio of the main storage becomes high;

a means for transferring content of the virtual-storage area from the main storage to the auxiliary storage according to the address translation table when occurrence of a failure in the computer system is detected, if the content of the virtual-storage area is allocated to the main storage, and if the content of the virtual-storage area has been updated since the virtual-storage area was allocated to the main storage; and a means for switching the first auxiliary storage to the second auxiliary storage for use if the first auxiliary storage is used for operation, and for switching the second auxiliary storage to the first auxiliary storage for use if the second auxiliary storage is used for operation.

3. A method for getting dump of a computer system that uses virtual storage, said method comprising the steps of:

controlling the virtual storage according to an address translation table that indicates a location in a main storage, or in a first auxiliary storage, where information in a virtual-storage area is stored;

transferring content of a virtual-storage area on the main storage from the main storage to the first auxiliary storage when a utilization ratio of the main storage becomes high;

storing the content of the virtual-storage area, which has been updated since the virtual-storage area was allocated to the main storage, in the first auxiliary storage according to the address translation table when occurrence of a failure in the computer system is detected; and switching the first auxiliary storage, which is working, to a second auxiliary storage.

4. A method for getting dump of a computer system that uses a plurality of pieces of virtual storage, said method comprising the steps of:

controlling each of the plurality of pieces of virtual storage according to an address translation table corresponding to each virtual storage, which indicates a location in a main storage, or in a first auxiliary storage, where information in each area of the plurality of pieces of virtual storage is stored;

transferring content of a virtual storage on the main storage from the main storage to the first auxiliary storage when a utilization ratio of the main storage becomes high;

storing content in each area of the plurality of pieces of virtual storage, which has been updated since the area of the virtual storage was allocated to the main storage, in the first auxiliary storage according to the address translation table when occurrence of a failure in the computer system is detected; and switching the first auxiliary storage, which is working, to a second auxiliary storage.

5. A method for getting dump of a computer system that uses virtual storage, said method comprising the steps of:

controlling the virtual storage according to an address translation table that indicates a location in a main storage, or in a first auxiliary storage, where information in a virtual-storage area is stored;

saving the address translation table in the first auxiliary storage if a page-out occurs in the address translation table;

storing content of the virtual-storage area, which has been updated since the virtual-storage area was allocated to the main storage, in the first auxiliary storage according to the address translation table when occurrence of a failure in the computer system is detected; and restoring the address translation table, which has been saved in the first auxiliary storage, in the main storage before switching the first auxiliary storage, which is working, to a second auxiliary storage.

6. An apparatus for getting dump of a computer system that uses virtual storage comprising:

a means for controlling the virtual storage according to an address translation table that indicates a location in a main storage, or in a first auxiliary storage, where information in a virtual-storage area is stored;

a means for saving the address translation table in the first auxiliary storage if a page-out occurs in the address translation table;

a means for storing content of the virtual-storage area, which has been updated since the virtual-storage area was allocated to the main storage, in the first auxiliary storage according to the address translation table when occurrence of a failure in the computer system is detected; and a means for restoring the address translation table, which has been saved in the first auxiliary storage, in the main storage before switching the first auxiliary storage, which is working, to a second auxiliary storage.

7. An apparatus with a main storage and an auxiliary storage that can establish a virtual-storage area on said main storage and said auxiliary storage, comprising:

a processing part to output information in said main storage among information in said virtual-storage area to said auxiliary storage when a utilization ratio of said main storage becomes high;

a processing part to input said information output from said main storage to said auxiliary storage to said main storage when referring to or updating said information among the information in said virtual-storage area output from said main storage to said auxiliary storage; and a processing part to output, when a failure occurs, the information in said main storage among the information in said virtual-storage area to said auxiliary storage to which said information in said main storage is output when the utilization ratio of said main storage becomes high, wherein:

dump information in said virtual-storage area when said failure occurs is a combination of said information output from said main storage to said auxiliary storage when the utilization ratio of said main storage becomes high and said information output from said main storage to said auxiliary storage when said failure occurs.

8. A processing method of a computer system with a main storage and an auxiliary storage that can establish a virtual-storage area on said main storage and said auxiliary storage, comprising:

outputting information in said main storage among information in said virtual-storage area to said auxiliary storage when a utilization ratio of said main storage becomes high;

inputting said information output to said auxiliary storage to said main storage when referring to or updating said information output to said auxiliary storage among the information in said virtual-storage area; and outputting, when a failure occurs in said computer system, the information in said main storage among the information in said virtual-storage area to said auxiliary storage to which said information in said main storage is output when the utilization ratio of said main storage becomes high, wherein:

dump information in said virtual-storage area when said fault occurs is a combination of said information output from said main storage to said auxiliary storage when a utilization ratio of said main storage becomes high and said information output from said main storage to said auxiliary storage when said fault occurs.

* * * * *